Nov. 21, 1939.   L. A. LOGAN   2,180,712
ADSORBER APPARATUS
Filed Aug. 31, 1937
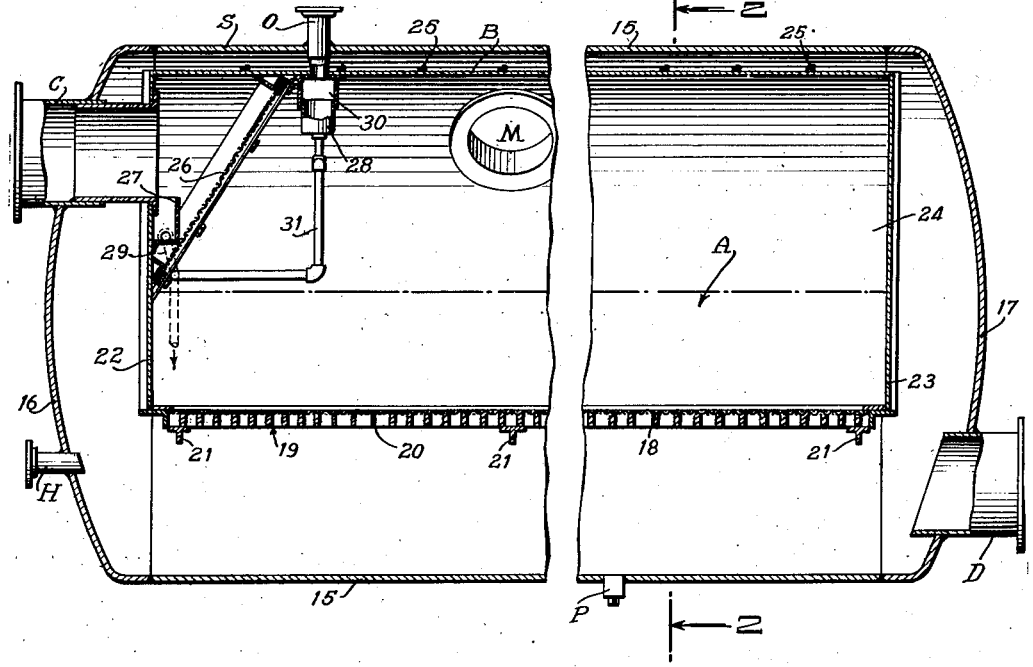
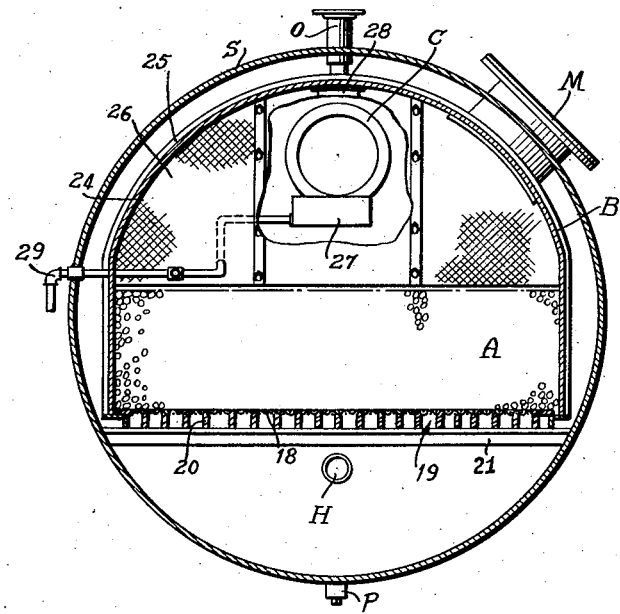
INVENTOR
LEONARD A. LOGAN
BY
Charles C. Scheffler
ATTORNEY Patented Nov. 21, 1939

2,180,712

UNITED STATES PATENT OFFICE 2,180,712

ADSORBER APPARATUS

Leonard A. Logan, Flushing, N. Y., assignor to Carbide and Carbon Chemicals Corporation, a corporation of New York Application August 31, 1937, Serial No. 161,735

2 Claims. (Cl. 183—4)

The invention relates to apparatus for separating and recovering fluids by adsorption, and is particularly concerned with an improved adsorber structure for recovering solvents or other vapors from mixtures thereof with air, by means of a solid adsorbent material. Although not limited with respect to the nature of the adsorbent material, the preferred embodiment of the invention is especially adapted for use with an activated carbon adsorbent.

Many types of adsorption apparatus have been shown in the art, the essential features of which generally consist of a container vessel, usually of metal, provided with a support therein for holding a layer or bed of solid adsorbent, in a position whereby fluid flow through the vessel is restricted to a path traversing the adsorbent. Support means for the adsorbent bed has taken many forms, but prior apparatus has been subject to definite disadvantages in operation, particularly with activated carbon as an adsorbent. The adsorption capacity of some types of activated carbon is known to be inversely proportional to the amount of moisture held by it at the start of the adsorption process, and wetting of the carbon is undesirable. It is customary to remove adsorbed material from active carbon by heating directly with steam, and steam condensation on the walls of the adsorber shell will, unless precautions are taken to prevent it, flow into and wet the entire outer edge portion of the adsorbent. This will decrease appreciably the effective adsorptive capacity of the entire carbon bed, and greatly detracts from efficiency of many prior known adsorption systems. It is also a fact that adsorbed solvents or other fluids are quite often corrosive in nature to the metal of the adsorber shell, and the contact therewith of the steam and adsorbed vapor mixture has often caused dangerous and expensive corrosion.

It is an object of this invention to provide improved adsorber apparatus in which a more uniformly effective adsorption capacity is maintained in the adsorbent bed through the prevention of wetting of the bed by condensation formed on the walls of the container vessel. It is a further object to provide means in an adsorber structure for fully protecting the container walls from corrosion by vapor mixtures of steam and adsorbed material.

Other objects and novel features of the invention will be apparent from a description of the accompanying drawing, in which:

Fig. 1 is a broken longitudinal mid-section of one type of adsorber embodying the invention; and Fig. 2 is a cross section taken on the line 2—2 of Figure 1.

As shown, S represents a closed container vessel having supported therein a basket B carrying a layer or bed of adsorbent material A, preferably of granular activated carbon. The basket and associated support structure are arranged, as will be further described, in a manner whereby all fluid flow within the adsorber is restricted to a path directly through the adsorbent bed A. Supply conduit C provides access directly into the basket B for fluid mixtures to be treated, and unadsorbed fluid is discharged through conduit D communicating with the space outside of the basket. Fluid such as steam for removing adsorbed materials is introduced through conduit H below and outside of the basket, and after passing through the adsorbent bed A the steam and evolved adsorbed vapors are taken off through conduit O extending through the container wall into the interior of the basket.

The container vessel S comprises a cylindrical portion 15 to the ends of which are welded convex head portions 16 and 17 respectively to complete the closed vessel. Both the supply conduit C and the discharge port D may be made large enough to serve as manholes if desired, and in addition another manhole M is provided, through which adsorbent material can be supplied to the bed A. In the bottom of the container a drain pipe P permits removal of any steam condensate which may be formed on the walls of the vessel.

The basket B comprises a foraminous under support 18 carrying the adsorbent bed and permitting gas passage therethrough. This is reinforced by a continuous frame 19 extending horizontally with the container and composed of grills 20 of welded bars supported upon the stringers 21. End plates 22 and 23 are welded in gas tight connection with the frame 19, and a continuous metal sheet 24 is bowed around these end plates and joined in gas tight connection to the other two edges of the frame 19. Reinforcing angles 25 may be used to stiffen the sheet 24 and permit the use of lighter construction than would otherwise be necessary. A screen 26 is preferably provided, and positioned diagonally across the basket immediately in front of the delivery conduit C in order to diffuse the fluid mixture entering the basket.

By this structure there is provided a fluid tight cover of canopy form over the entire adsorbent bed. Fluid to be treated enters within the canopy, passes through the adsorbent, and unadsorbed vapor is taken off beneath the bed. Steam flows in the reverse direction, entering outside the canopy or basket, passing through the adsorbent bed, and steam mixed with adsorbed vapors is removed from within the canopy through the outlet O terminating therein. Contact of corrosive vapors with the walls of the container is thus prevented. The basket, particularly the canopy portion thereof, is preferably made of corrosion-resistant metal so that in no part of the adsorber structure is any substantial corrosion encountered.

The basket is spaced on all sides from the container walls, and steam condensate on such walls has free passage to the bottom of the adsorber without contacting and wetting the adsorbent bed, where it can be drawn through drain pipe P. By making the entire basket structure of a light weight low heat capacity metal there is little or no condensation encountered from this source. As a further precaution at points in the canopy where a heavier metal structure is necessary, such as at the fluid inlet C and the steam-vapor outlet O, troughs can be provided to catch and drain off condensate to the outside of the basket. Two of these are shown in Figure 1 as represented by reference numerals 27 and 28 respectively. The horizontal trough 27 is fastened inside of the basket wall 22 immediately beneath the entrance of the supply conduit C, and any moisture collecting here is drained off through pipe 29 to the outside of the basket. The container 28 in similar manner collects any condensate from about the outlet O, where it is welded by means of angles 30 to the inside of the canopy member 24, and the pipe 31 connects with the drain 29 to lead moisture away from the adsorbent to the outside of the basket. A similar trough and drain can also be provided beneath the manhole M, but is omitted from the drawings in order to show more clearly other essential elements. Wetting of the adsorbent bed by condensate is thus avoided, and a uniformly low water content can be maintained throughout the bed, contributing improved efficiency to the adsorber, and a more uniform and positive adsorptive capacity. In the specific embodiment shown in the drawing the container vessel is mounted in a horizontal position, but a similar canopy structure is well adapted for use with the adsorber in the vertical position, and such modification is included within the scope of the invention. Other changes, particularly in structural details, will be apparent to those skilled in the art within the essential principles of the invention, which should not be limited other than as defined by the appended claims.

I claim:

1. An adsorber for recovering solvent vapors from mixtures thereof with air, said adsorber comprising a cylindrical container vessel, a bed of activated carbon adsorbent in said vessel, a basket supporting said bed in horizontal spaced relation with the walls of said vessel and including a foraminous under support for said adsorbent, a fluid tight canopy connected with said under support and forming a closed gas space above the adsorbent, inlet means for air to be treated communicating with the interior of said canopy above the adsorbent, exit means for denuded air outside of said canopy, steam inlet and exit means in the reverse position respectively to said air inlet and exit, and means at the fluid inlet and exit within said canopy to collect condensate and carry the same to the outside of said basket.

2. An adsorber for recovering solvent vapors from mixtures thereof with air, said adsorber comprising a horizontal cylindrical container vessel, a substantially rectangular horizontal bed of activated carbon adsorbent in said vessel, a basket supporting said bed in spaced relation with the walls of said vessel and including a foraminous under-support for said adsorbent in connection with a fluid-tight corrosion-resistant metal canopy forming a closed gas space over said bed, means for introducing the air to be treated to the interior of said canopy above the adsorbent bed and for removing denuded air from the exterior of said basket, means for introducing steam below said basket and for removing the steam and adsorbed vapor mixture from the interior of said canopy over the adsorbent bed, and means at the fluid inlet and outlet within said canopy to collect condensate and carry the same to the outside of said basket.

LEONARD A. LOGAN.